(12) United States Patent
Thommen et al.

(10) Patent No.: US 12,465,432 B2
(45) Date of Patent: Nov. 11, 2025

(54) PLAY-FREE FAST LOCKING NAVIGATION TRACKER CONNECTION

(71) Applicant: DEPUY IRELAND UNLIMITED COMPANY, County Cork (IE)

(72) Inventors: Daniel Thommen, Diegten (CH); Anthony Leandri, Goncelin (FR)

(73) Assignee: DEPUY IRELAND UNLIMITED COMPANY, County Cork (IE)

( * ) Notice: Subject to any disclaimer, the term of this patent is extended or adjusted under 35 U.S.C. 154(b) by 295 days.

(21) Appl. No.: 18/359,434

(22) Filed: Jul. 26, 2023

(65) Prior Publication Data
US 2025/0032192 A1 Jan. 30, 2025

(51) Int. Cl.
*A61B 34/20* (2016.01)

(52) U.S. Cl.
CPC ...... *A61B 34/20* (2016.02); *A61B 2034/2072* (2016.02)

(58) Field of Classification Search
CPC . A61B 34/20; A61B 2034/2072; A61B 90/39; A61B 2017/00477; A61B 2034/2055; A61B 2090/3983; F16B 21/16
See application file for complete search history.

(56) References Cited

U.S. PATENT DOCUMENTS

| 11,644,053 | B2 | 5/2023 | Lindenmann |
| 2018/0296278 | A1 | 10/2018 | Van Beek |
| 2019/0175228 | A1 | 6/2019 | Elimelech |
| 2019/0290297 | A1 | 9/2019 | Haider |

OTHER PUBLICATIONS

International Search Report for corresponding PCT/EP2024/071275 mailed on Oct. 18, 2024.

*Primary Examiner* — Jonathan T Kuo
(74) *Attorney, Agent, or Firm* — Kramer & Amado, P.C.

(57) ABSTRACT

A navigation tracker connection interface system, including: a first interface including: a first interface surface; an extension member having a first extension ramp surface facing the first side; and an interface hole on the side of the first interface; and a second interface including: a housing including: a second interface surface; an interface pin; a housing opening; and a channel; a locking member configured to slide in the channel including: a locking member opening; and a first locking member ramp surface; and a biasing member configured to bias the locking member, wherein interface hole is configured to receive the interface pin, wherein the first interface surfaces are configured to engage the second interface surfaces, and wherein the first locking member ramp surface is configured to engage the first extension ramp surface when the biasing member biases the locking member.

20 Claims, 13 Drawing Sheets

PLAY-FREE FAST LOCKING NAVIGATION TRACKER CONNECTION

FIELD OF THE DISCLOSURE

Various exemplary embodiments disclosed herein relate to a play-free fast locking navigation tracker connection.

BACKGROUND

Navigation arrays are connected to other components, e.g. instruments, adaptors or bone anchoring systems, so that these components may be tracked. Traditionally, such navigation array connections include metal/machined components on either side of the connection, which are connected via screw based mechanisms. This works if both sides of the connection are reusable or produced at relatively high part costs, and if the user can ensure that the connection screw is adequately tightened (very subjective). The use of screws also takes significant time and slows down the surgical procedure.

SUMMARY

A summary of various exemplary embodiments is presented below.

Various embodiments relate to a navigation tracker connection interface system, including: a first interface including: a first interface surface on a side of the first interface; an extension member extending from the side of the first interface having a first extension ramp surface facing the first side; and an interface hole on the side of the first interface; and a second interface including: a housing including: a second interface surface on a side of the second interface; an interface pin extending from the side of the second interface; a housing opening on the side of the second interface; and a channel; a locking member configured to slide in the channel including: a locking member opening; and a first locking member ramp surface; and a biasing member configured to bias the locking member, wherein interface hole is configured to receive the interface pin, wherein the first interface surfaces are configured to engage the second interface surfaces, and wherein the first locking member ramp surface is configured to engage the first extension ramp surface when the biasing member biases the locking member.

Various embodiments are described, wherein the first interface surface is a flat surface and the second interface surface is a curved surface.

Various embodiments are described, wherein the second interface surface lies on a perimeter of a circle.

Various embodiments are described, wherein the first interface surface has an interrupted V shape.

Various embodiments are described, wherein the first interface surface is a curved surface and the second interface surface is a flat surface.

Various embodiments are described, wherein the first interface surface lies on a perimeter of a circle.

Various embodiments are described, wherein the second interface surface has an interrupted V shape.

Various embodiments are described, further including: a retention pin, wherein the locking member further includes a locking member notch, wherein the housing includes retention pin holes, wherein the retention pin is configured to engage the retention pin holes, and wherein the retention pin is configured to engage the locking member notch to limit motion of the locking member.

Various embodiments are described, wherein the locking member opening aligns with the housing opening when the locking member is pressed.

Various embodiments are described, wherein the extension member includes an extension body and an extension head, wherein the first extension ramp surface is on the extension head and wherein the extension head has a width greater than a width of the extension member.

Various embodiments are described, wherein the extension member includes a second extension ramp surface, wherein locking member includes a second locking member ramp surface, and wherein the second locking member ramp surface is configured to engage the second extension ramp surface when the biasing member biases the locking member.

Various embodiments are described, wherein the interface hole has a conical shape.

Various embodiments are described, wherein the interface pin has one of a conical shape or mushroom shape.

Various embodiments are described, wherein the biasing member is configured to biases the locking member in a linear direction along the channel.

Various embodiments are described, wherein the biasing member is configured to bias the locking member in a rotational direction.

Various embodiments are described, wherein the first interface is connected to an navigation tracker.

Various embodiments are described, wherein the first interface is made of plastic and is disposable.

Various embodiments are described, wherein the second interface is made of metal.

Various embodiments are described, wherein the housing includes a plurality of cleaning ports and the locking member includes a cleaning port.

Various embodiments are described, wherein the biasing member is a coiled spring.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1B:
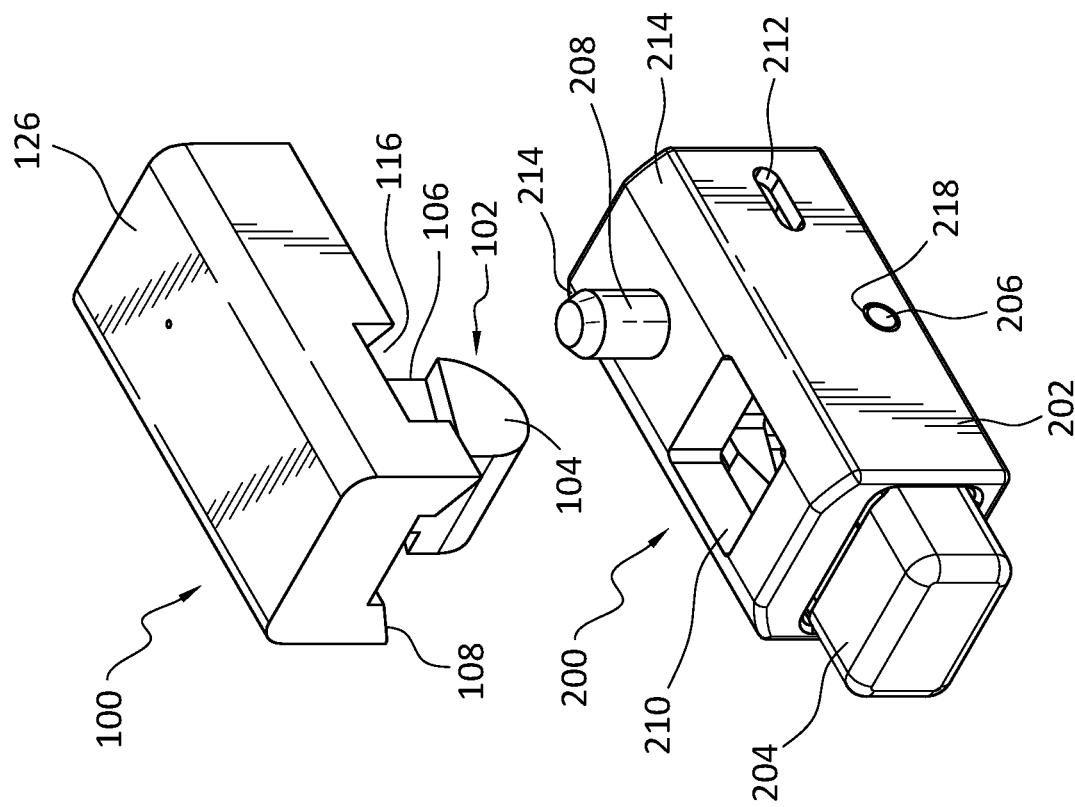
FIGS. 1A and 1B illustrate a connection system that includes a tracker interface and a connection interface.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of navigation systems will now be presented with reference to various apparatuses and techniques. These apparatuses and techniques will be described in the following detailed description and illustrated in the accompanying.

Computer-assisted surgery is becoming more common. Navigational systems are used in computer-assisted surgery that includes a tracking unit, such that the relative pose or three-dimensional position and orientation of fiducials attached to a plurality of the navigational system navigation arrays may be tracked in real time and position information may be provided to the surgeon using a display or an alternative visualization device. The tracking unit may measure the relative motions between any and all components coupled to navigation arrays in a known manner. Tracking may be performed in a number of ways, e.g., using stereoscopic optical detectors, ultrasonic detectors, radio frequency (RF) location detectors, sensors configured to receive position information from inertial measurement units, etc. Tracking in real time, in some embodiments, means high frequencies greater than twenty Hertz, in some embodiments in the range of one hundred to five hundred Hertz, with low latency, and in some embodiments less than five milliseconds. The tracking unit may also include cameras or use the stereoscopic optical detectors to detect the location of tracking arrays and hence the items to which the tracking arrays are connected.

Fiducials of the navigational system may be attached to the navigation arrays. Fiducials may be arranged in predetermined positions and orientations with respect to one another. The fiducials may be aligned to lie in planes of known orientation (e.g., perpendicular planes, etc.) to enable setting of a Cartesian reference frame. The fiducials may be positioned within a field of view of a navigation system and may be identified in images captured by the navigation system. The fiducials may be single-use reflective navigation markers. Exemplary fiducials include infrared reflectors, light emitting diodes (LEDs), radio frequency (RF) emitters, spherical reflective markers, blinking LEDs, contrast pattern based markers and so forth.

The navigation array may be mounted on an instrument, the patient, a robot arm, etc. to determine the position of the attached item. The structure and operation of the navigation array may vary depending on the type of navigation system used. In some embodiments, the navigation array may include one or more sphere-shaped or other fiducials for use with an optical navigation system, for example, a robotic navigation system. The navigation system may facilitate registering and tracking of the position and/or orientation of the navigation array and, by extension, an end effector and its relative distance to other objects in the operating room, e.g., a patient, a surgeon, etc.

Navigation arrays may also be attached to the patient in known locations. Typically these navigation arrays are attached to bones of the patient. Once the navigation arrays are attached to the patient's bones, X-rays or other images may be used to register the location of the arrays to the patient's bones. Because the navigation arrays may be viewed and tracked by the tracking unit, the tracking unit can determine the relative location of a tool to the patient anatomy by tracking the location of the navigation arrays attached to the patient and then the registration information of the navigation arrays to the patient's bones.

The navigation array includes a connector to connect with other components, e.g., instruments, adaptors, robot arms, tools, or bone anchoring systems. This connection affects the final location of the navigation array relative to the attached component. If this connection is not precise and consistent, the location of the navigation array to the attached component is not known accurately enough. For example, when a drill is used the location of the tip of the drill needs to be known. If the connection between the drill and the navigation array is accurately known, then when the tracking system determines the location of the navigation array the location of the drill tip may then be accurately determined. In many applications, the navigation system would need to be "taught" in the beginning where the tip of the drill is located, relative to the navigation array. This is called calibration step. However, there are situations where the manufacturing process, including e.g. feature tolerances, assembly part fits etc. is designed so that the possible variability of the drill tip location relative to the tracker after the assembly step is so small that a calibration step is not required. This results in a pre-calibrated connection. When using such a pre-calibrated connection, only a quick verification may be needed to determine that the system does indeed have the correct location of the drill tip (or other part of the tool, instrument, or other component).

If the connection of the navigation array to the drill is not consistent and accurate, then an additional calibration step is needed. This adds time to the surgical procedure and would have to be carried out for each of the various tools and/or instruments used in the surgery.

Traditionally, navigation array connections include machined metal components on either side of the connection, which are connected via screw based mechanisms. This works if both sides of the connection are reusable or produced at relatively high part costs, and if the user can ensure that the connection screw is adequately tightened (very subjective) as the tightness of the screw can affect the accuracy of the connection. Further, the use of a screw takes more time to make the needed connections and may slow down the surgical procedure. Other pre-calibrated navigation array connections may be implemented using latching or other mechanisms, but again such systems typically are manufactured using machined metal parts that are expensive.

Embodiments will be described herein that may be manufactured using plastics to reduce the cost of the connection parts and to allow for disposable/one time use items. These embodiments combine the advantages of well-defined and large interface connections and orientation features. It also uses a button for a fast, reliable, and play-free connection with a predictable amount of preload due to the specific design features. The button may be a locking member. It also allows parts with larger tolerances that lowers cost for manufacturing due to a specific male connection and larger cross section in critical connection areas. These embodiments allow for injection molding of the tracker connection portion that allow for the use of low cost disposable navigation arrays. It is also possible that the connection interface may be injection molded, but as it is not intended to be disposable, it may be made of metal as it is a cleanable and reusable part.

Figure 1A:
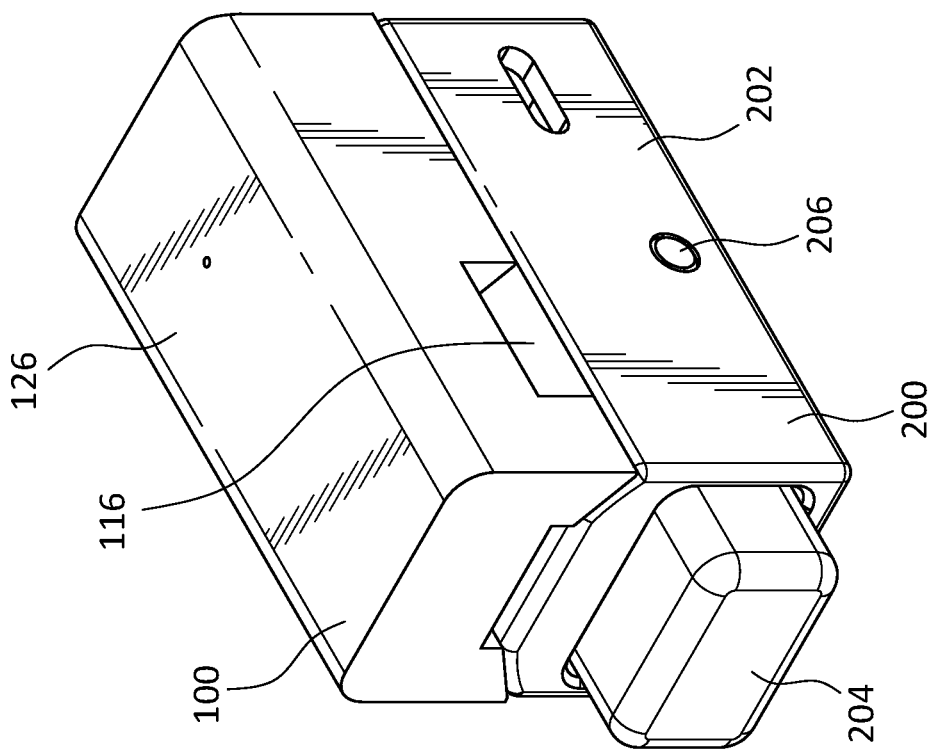

FIGS. 1A and 1B illustrate a connection system that includes a tracker interface 100 and a connection interface 200. As described above the tracker interface 100 will typically be made using low cost materials and manufacturing processes because the tracker interface 100 is intended to be disposable and used only once. For example, the tracker interface 100 may be manufactured of plastic using injection molding. Due to the unique geometry and features of the tracker interface 100, it is possible to achieve an accurate and repeatable connection with the connection interface 200 so that the connection system leads to a pre-calibrated component.

Figure 1C:
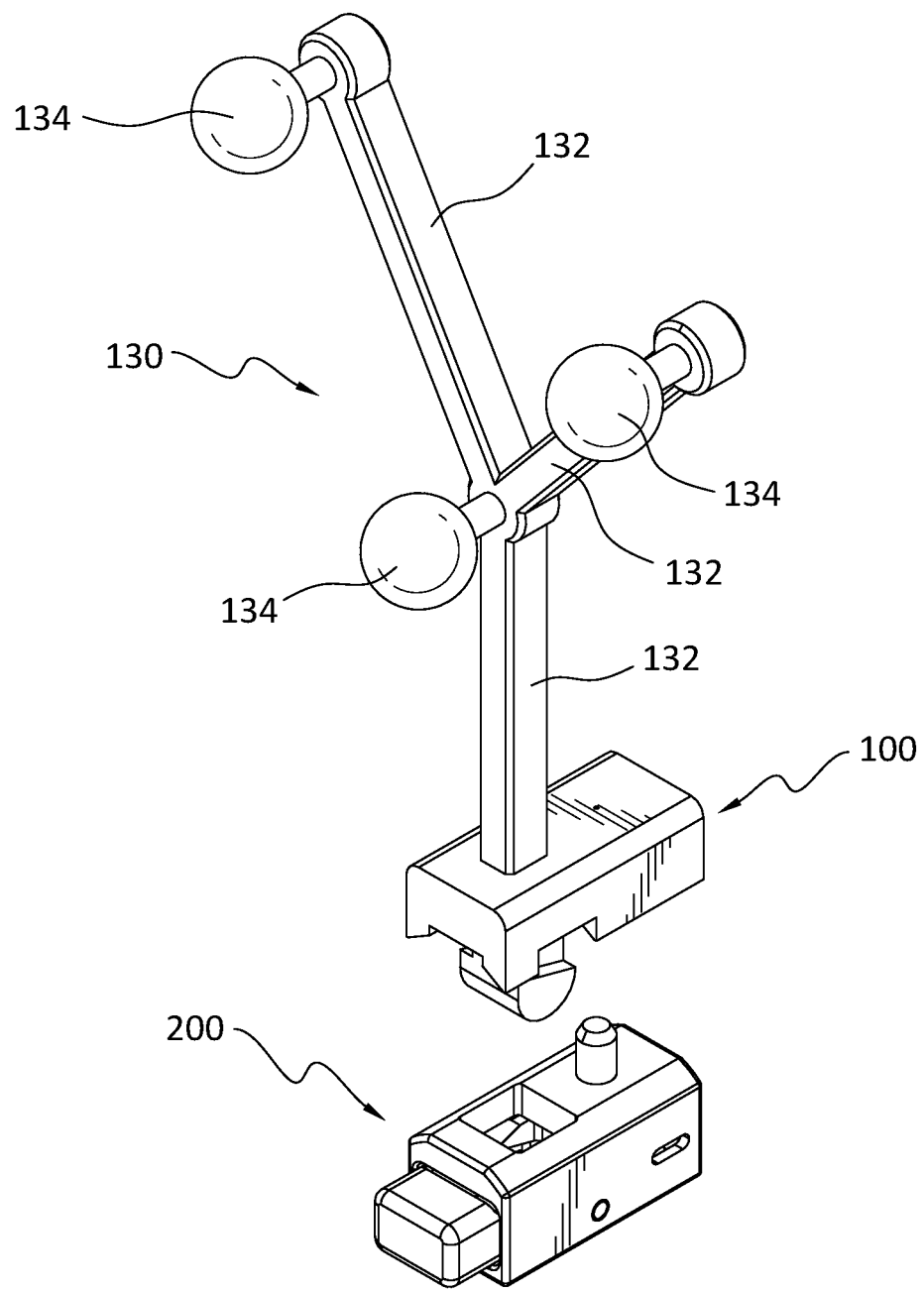
FIG. 1C illustrates a tracker interface with a navigation array attached.

FIG. 1C illustrates a tracker interface 100 with a navigation array 130 attached. The navigation array 130 may include array arms 132 and reflective spheres 134. The reflective spheres 134 are in known locations and may be tracked by the tracking system. Because the location of the reflective spheres 134 are known relative to a component connected to the connection interface 200, the location of the component may be accurately and repeatably determined. The navigation array 130 is only an example, and any other type of navigation array 130 may also be used instead as described above. In the rest of the disclosure the tracker interface 100 will be shown without the navigation array 130 for ease in describing the features of the tracker interface 100.

The connection interface 200 connects to a component which may be a variety of things as described above. As the connection interface 200 is more permanent and reusable, it may be manufactured from metal, but also may be manufactured from lower cost materials such as plastic. The connection interface 200 is also designed to be cleanable as it is a reusable part.

The tracker interface 100 includes a tracker interface body 126 that has a flat top that is generally rectangular in shape and may have rounded edges as illustrated. The tracker interface body 126 may take other shapes as needed. A extension member 102 may extend from an inner surface 114 (see, e.g., FIG. 3A) of the tracker interface body 126. The extension member 102 includes an extension head 104 connected and an extension body 106. The extension body 106 connects the extension head 104 to the inner surface 114 of the tracker interface body 126. The lower side of the tracker interface body 126 may also include interface surfaces 108. The interface surfaces 108 may also be considered one interrupted surface.

The tracker interface 100 may include a interface notch 116 that allows for the location of the extension member 102 to be seen as it is inserted into connection interface 200. Each of these parts of the tracker interface 100 will be described in greater detail below.

The connection interface 200 includes a housing 202. The connection interface 200 is generally rectangular so that it is complementary to the tracker interface 100, but the connection interface 200 may take other shapes as well that are complementary to the tracker interface 100. The connection interface 200 may include a button 204 that has a portion withing the housing 202 and a portion that extends outside the housing 202. The button may be a locking member. A top of the connection interface 200 may include a housing opening 210 configured to receive the extension member 102 of the tracker interface 100. The top of the connection interface 200 also may include a interface pin 208 that is configured to engage with an interface hole 112 (see FIG. 3A) in the tracker interface 100. The top surface of the housing 202 may also include curved interface surfaces 214 at the edges. The curved interface surfaces 208 may also be considered one interrupted surface. The connection interface 200 may also include a retention pin 206. Further, the connection interface 200 may include various cleaning ports 212 that allow for the connection interface 200 to be effectively cleaned between uses. Each of the parts of the connection interface 200 will be described in greater detail below.

Figure 2A:
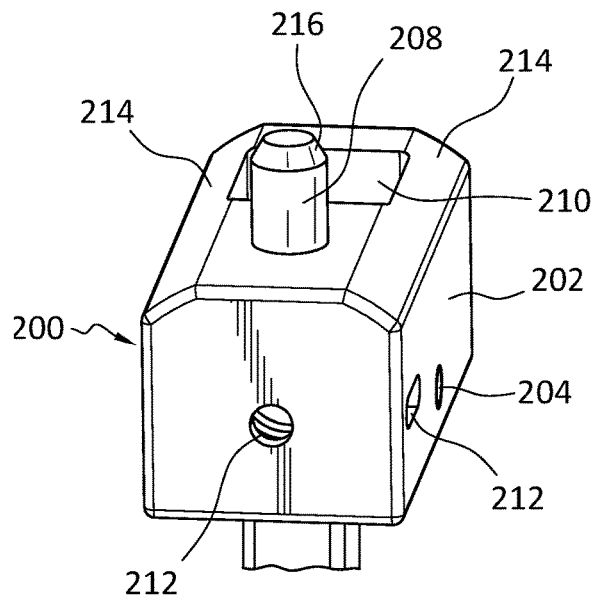
FIGS. 2A and 2B illustrate a top perspective view and end view of the connection interface.
Figure 2B:
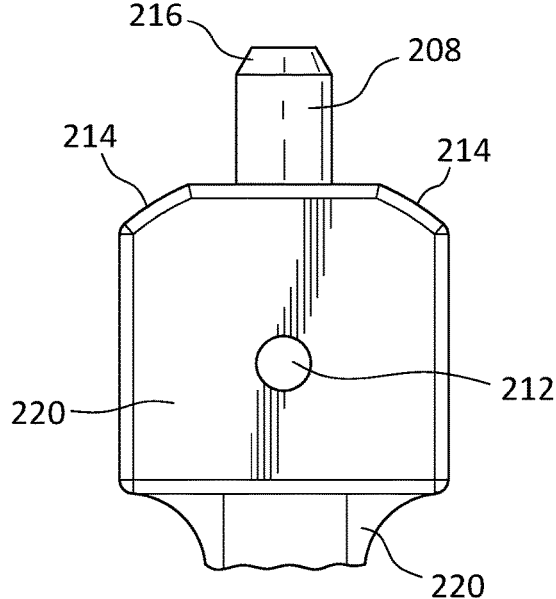
Figure 3A:
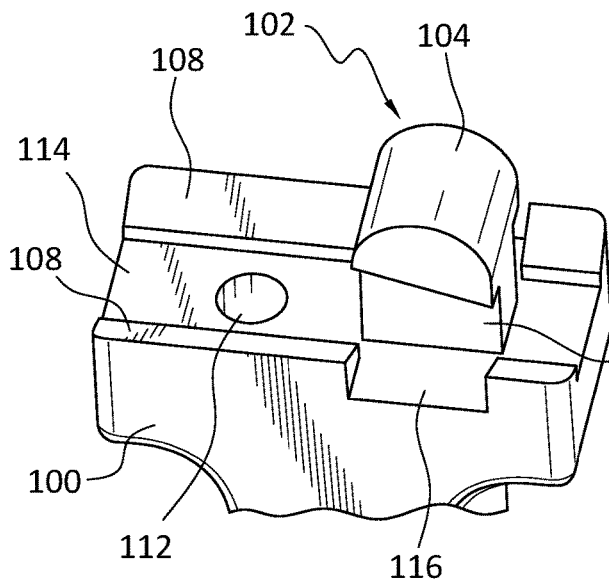
FIGS. 3A and 3B illustrate a bottom perspective view and end view of the tracker interface.
Figure 3B:
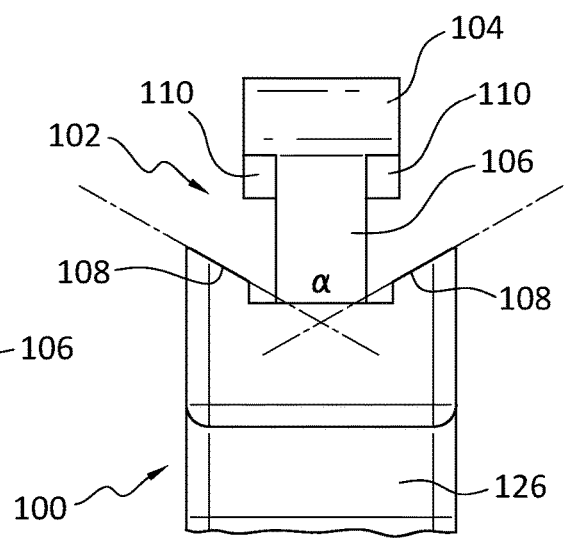
Figure 4A:
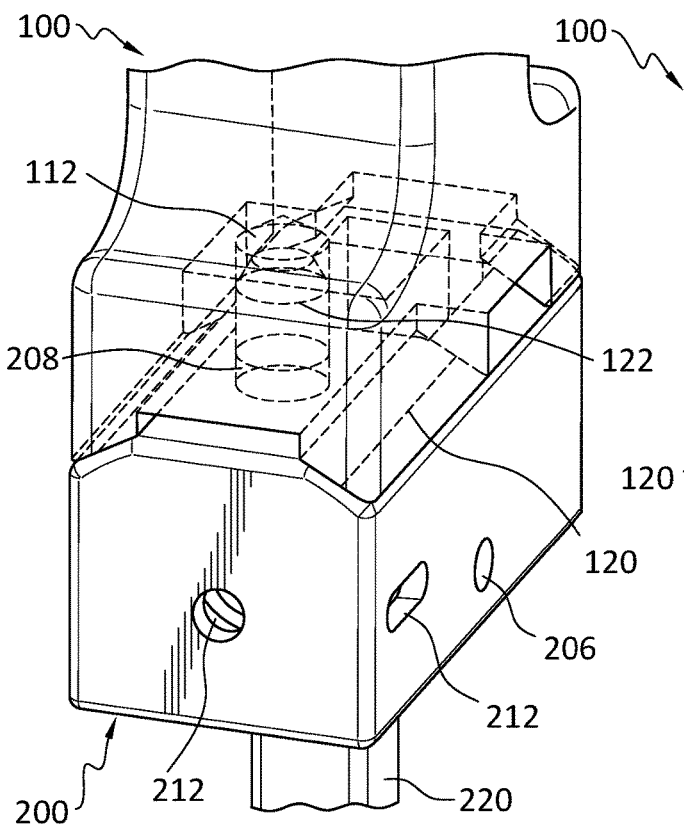
FIG. 4A illustrates the tracker interface engaged with the connection interface with the tracker interface being illustrated as transparent.
Figure 4B:
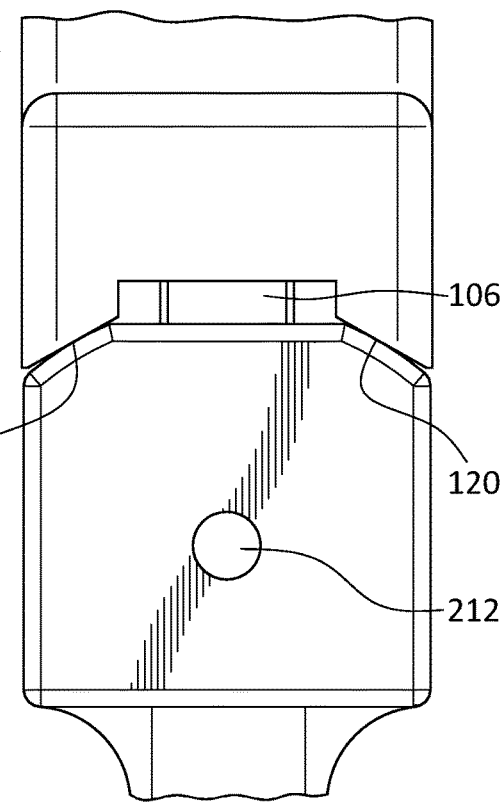
FIG. 4B illustrates and end view of the tracker interface engaged with the connection interface.

FIGS. 2A and 2B illustrate a top perspective view and end view of the connection interface 200. FIGS. 3A and 3B illustrate a bottom perspective view and end view of the tracker interface 100. FIG. 4A illustrates the tracker interface 100 engaged with the connection interface 200 with the tracker interface 100 being illustrated as transparent. FIG. 4B illustrates and end view of the tracker interface 100 engaged with the connection interface 200. FIGS. 2A-B, 3A-B, and 4A-B illustrate some of the contact surfaces between the tracker interface 100 and the connection interface 200. The connection interface 200 includes curved interface surfaces 214. In one example the curved interface surfaces 214 are along the diameter of a circle as illustrated in FIG. 2B. In this case the curved interface surface 214 have a specific constant radius of curvature. The curved interface surfaces 214 may take on other curved shapes as well. The tracker interface 100 includes interface surfaces 108. The interface surfaces 108 are generally flat and are configured to engage the curved interface surface 214. The interface surfaces 108 form an interrupted V shaped surface that has a subtended angle of a. The curved interface surfaces 214 and the interface surface 108 may be elongated in the same direction and face one another. Further the curved interface surfaces 214 has a general angle that corresponds to the angle of the interface surfaces 108 so that the opposite surfaces face each other.

FIGS. 4A and 4B illustrate a surface interface contact line 120. The surface interface contact line 120 is a line where the interface surface 108 and the curved interface surface 214 contact one another. This contact area is a line because the curved interface surface 214 is curved. The interface between the interface surfaces 108 and the curved interface surface 214 provide a general orientation and alignment between the tracker interface 100 and the connection interface 200.

Figure 5A:
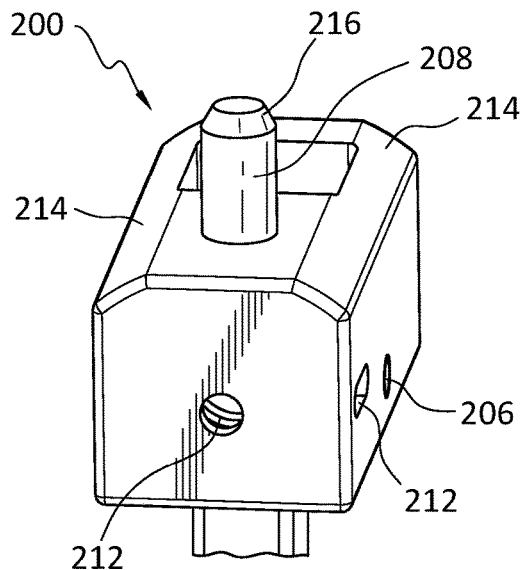
FIG. 5A illustrates a perspective view of the connection interface.
Figure 5B:
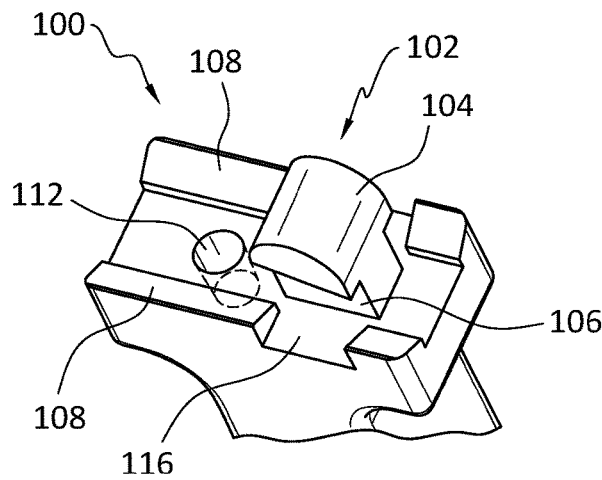
FIG. 5B illustrates a bottom perspective view of the tracker interface.
Figure 6B:
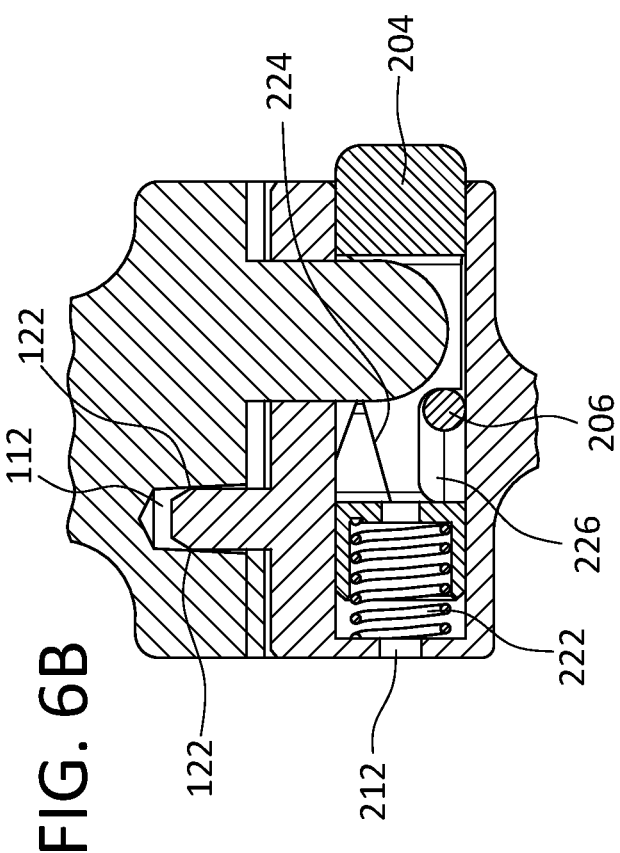
FIG. 6B illustrates a side cross-sectional view of the tracker interface engaged with the connection interface.
Figure 6C:
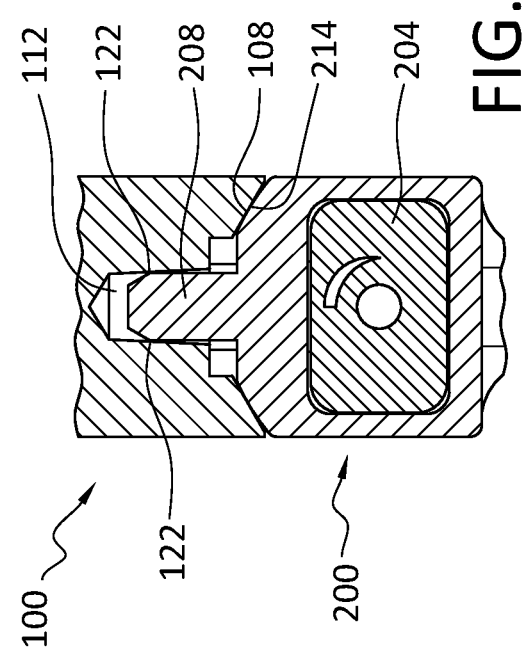
FIG. 6C illustrates an end cross-sectional view of the tracker interface engaged with the connection interface.
Figure 6A:
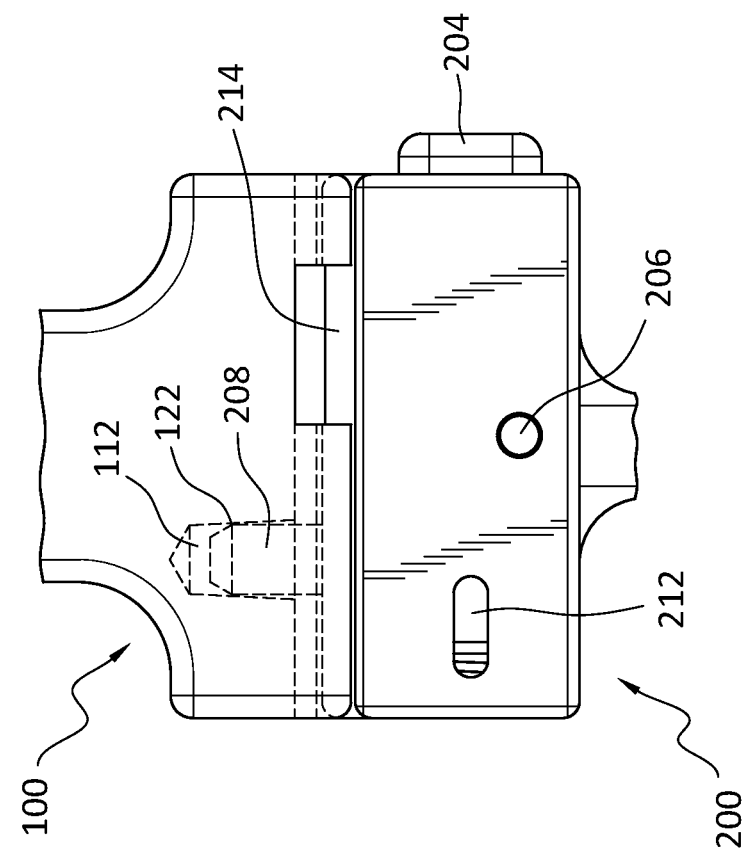
FIG. 6A illustrates a side view of the tracker interface engaged with the connection interface with portions of the tracker interface transparent.

FIG. 5A illustrates a perspective view of the connection interface 200. FIG. 5B illustrates a bottom perspective view of the tracker interface 100. FIG. 6A illustrates a side view of the tracker interface 100 engaged with the connection interface 200 with portions of the tracker interface 100 transparent. FIG. 6B illustrates a side cross-sectional view of the tracker interface 100 engaged with the connection interface 200. FIG. 6C illustrates an end cross-sectional view of the tracker interface 100 engaged with the connection interface 200. The connection interface 200 further includes the interface pin 208 that interfaces with the interface hole 112 to result in the interface pin contact line 122. The interface pin 208 prevents translation of the connection interface 200 relative to the tracker interface 100 along the length of the interface surfaces 108 and the curved interface surfaces 214. Further, the interface pin 208 prevents a rotation around the central axis of the curved interfaces 214, or a lateral shift between the tracker interface 100 and the connection interface 200

The interface pin 208 generally has a conical shape. It may have a tip 216 that has an additional conical shape to facilitate aligning the interface pin 208 with the interface hole 112. The interface hole 112 will also have a conical shape corresponding to the conical shape of the interface pin 208. This results in the interface pin contact line 122. The use of the conical shaped interface pin 208 and interface hole 112 prevent the over constraint that might exist when the interface pin 208 is inserted into the interface hole 112 if both were cylindrical without play, and a the same time, either the pin 208 or the interface hole 112 would have a positional tolerance shift relative to the interface surfaces 214 or 108. Also the use of the conical shapes allows for better injection moldability of the tracker interface. In other embodiments, the interface pin 208 could have other shapes as well that facilitate creating an interface pin contact line 122, such as for example a mushroom shape.

The combination of the curved interface surfaces 214 and the interface pin 208 on the connection interface 200 interfacing with the interface surfaces 108 and the interface hole 112 of the tracker interface 100 provide a well-defined interface for precisely and repeatably aligning the tracker interface 100 to the connection interface 200. A clamping mechanism will now be described that clamps the tracker interface 100 securely to the connection interface 200 to ensure a consistent and accurate position between the tracker interface 100 and connection interface 200 and hence between a navigation array 130 connected to the tracker interface 100 and a component connected to the connection interface 200.

Figure 7A:
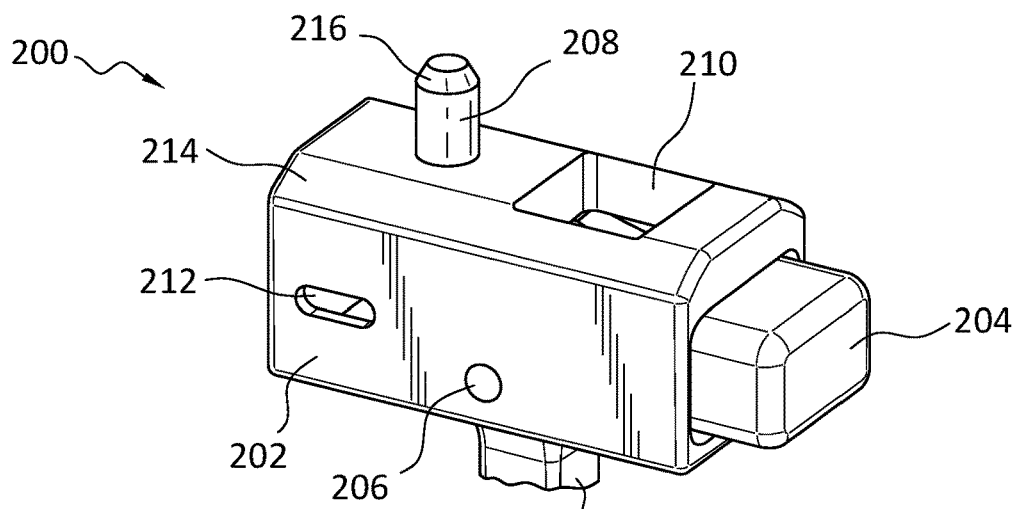
FIGS. 7A-C illustrate perspective, transparent perspective, and perspective cross-sectional view of the connection interface with the button in the closed position.
Figure 7B:
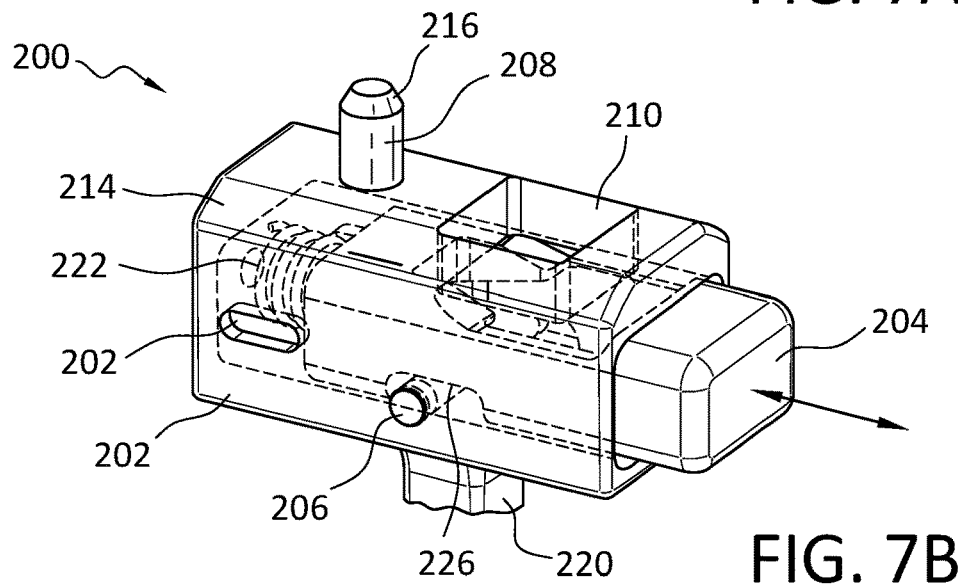
Figure 7C:
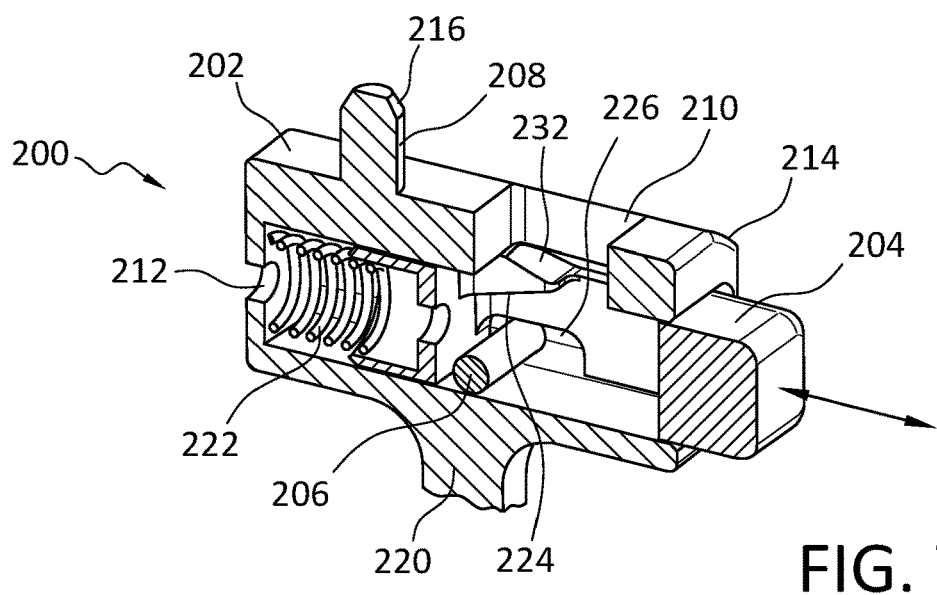

FIGS. 7A-C illustrate perspective, transparent perspective, and perspective cross-sectional view of the connection interface 200 with the button 204 in the closed position. The connection interface 200 includes a button 204 that slides inside the housing 202 and that is biased outward by a spring 222. While a spring 222 is illustrated other biasing members may be used as well. The button 204 includes a button notch 226 that engages the retention pin 206 to limit the range that the button 204 may slide. The side of the button notch 226 near the spring 222 limits how far the spring 222 can bias the button 204 outward as illustrated in FIGS. 7A-C where the spring 222 biases the button 204 outward until the button notch 226 engages the retention pin 206. The other side of the button notch 226 limits how far the button 204 may be pressed inward. Alternatively, an end of the button 204 that captures the spring 222 may serve to limit how far the button may be pressed inward.

The housing 202 includes a housing opening 210. The housing opening 210 is sized and configured to receive the extension member 102. When the button 204 is in the closed position as illustrated in FIGS. 7A-C, the extension member 102 of the tracker interface 100 is blocked from being inserted into the housing opening 210.

Figure 8A:
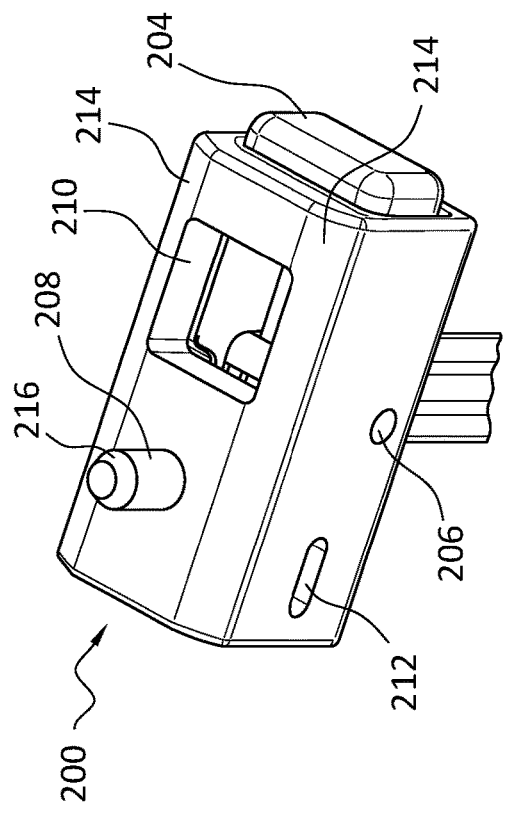
FIGS. 8A-C illustrate perspective, transparent perspective, and perspective cross-sectional view of the connection interface with the button in the open position.
Figure 8B:
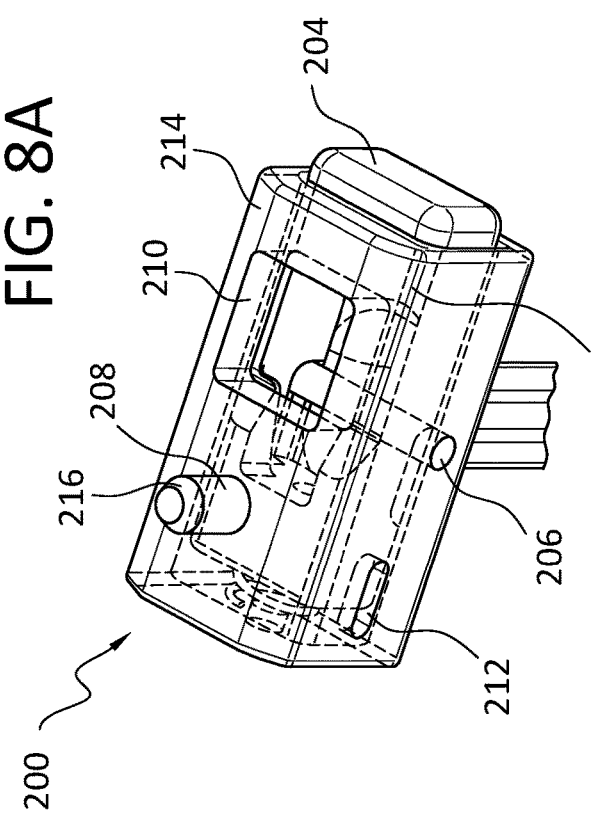
Figure 8C:
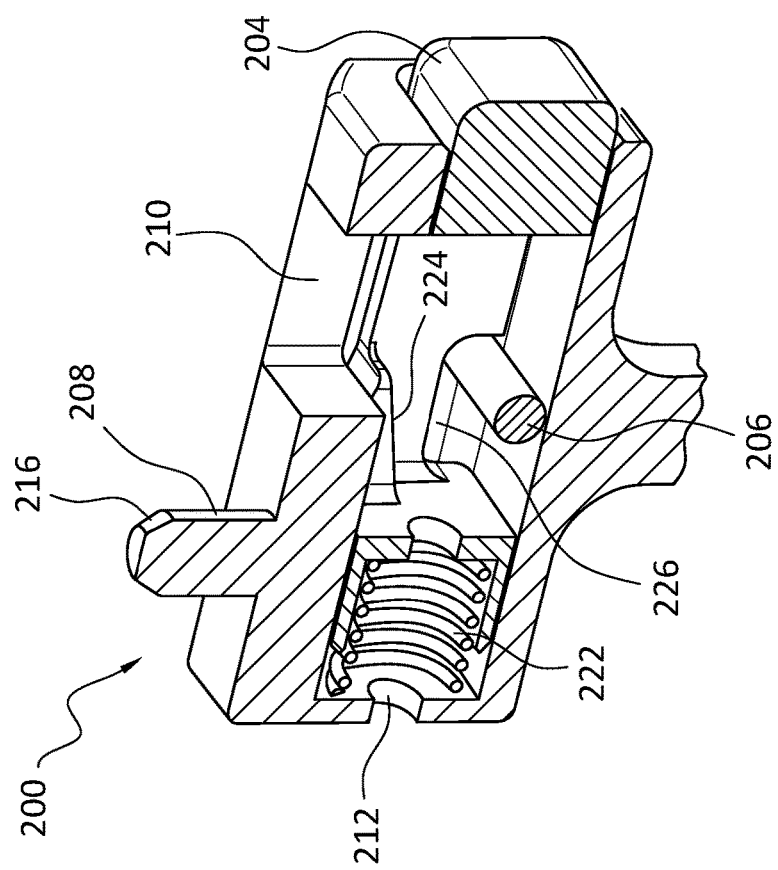
Figure 9A:
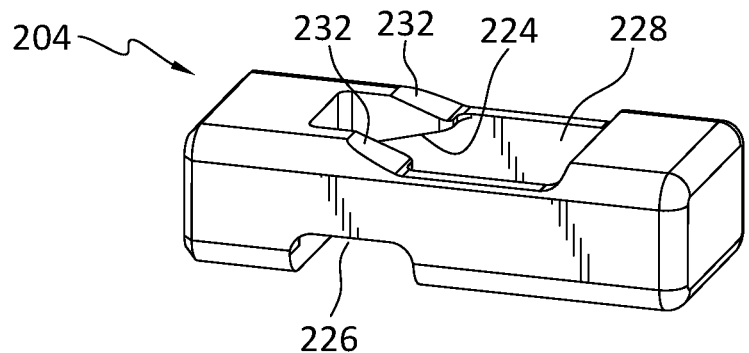
FIGS. 9A-D illustrate side perspective, side cross-sectional, top perspective, and end perspective views of the button.
Figure 9B:
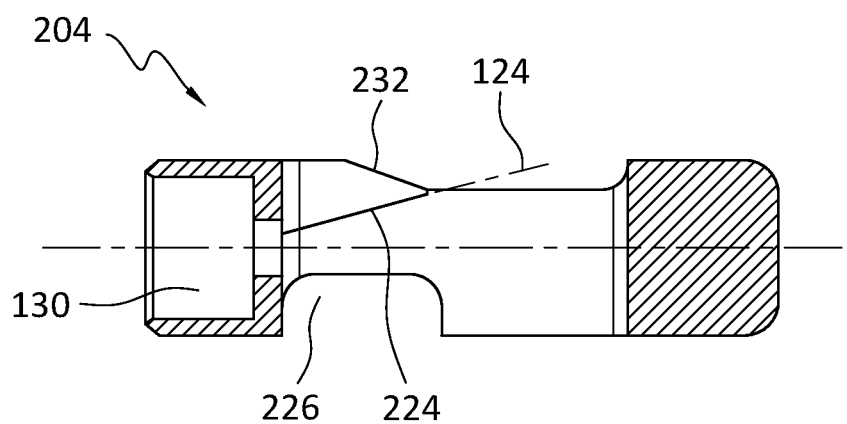
Figure 9C:
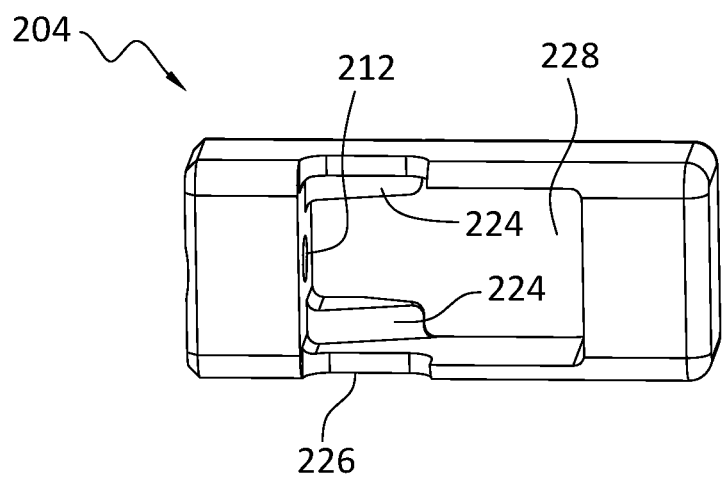
Figure 9D:
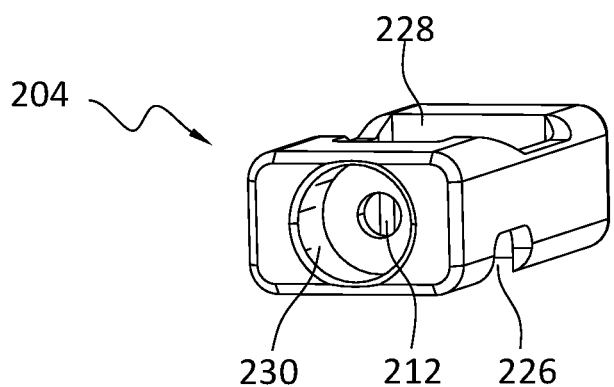

FIGS. 8A-C illustrate perspective, transparent perspective, and perspective cross-sectional view of the connection interface 200 with the button 204 in the open position. In FIGS. 8A-C, the button 204 is pressed inward until the button notch 226 engages the retention pin 206 to limit the inward motion of the button 204. In this position a button opening 228 (see FIG. 9A) aligns with the housing opening 210. This then allows for the extension member 102 of the tracker interface 100 to be inserted into the connection interface 200. Here aligning of the button opening 228 and housing opening 210 mean that the opening overlap sufficiently to allow for the extension member 102 to be inserted into the button opening 228 through the housing opening 210.

FIGS. 9A-D illustrate side perspective, side cross-sectional, top perspective, and end perspective views of the button 204. The button 204 has a generally rectangular shape with rounded edges. The shape of the button 204 generally complements the shape of a channel in the housing 202 that accepts the button 204. The button 204 may take on other shapes that are complementary to the channel in the housing 202. The connection interface 200 includes the button opening 228. The button opening 228, as described above, may align with the housing opening 210 when the button 204 is pressed inward. The button notch 226 limits the sliding range of the button 204 by engaging the retention pin 206 that is placed in retention pin holes 218 in the sides of the housing 202. The button 204 includes spring opening 230 that is configured to capture one end of the spring 222 so that the spring 222 may bias the button 204 outward. The other end of the spring 222 engages an inner wall of the housing 202. The spring opening 230 may also include a cleaning port 212 to allow for cleaning of the connection interface 200. The button 204 also includes button ramp surfaces 224 that are generally downward facing. While two button ramp surfaces 224 are illustrated, in other embodiments only one button ramp surface 224 may be used. As will be discussed below, the button ramp surface 224 will interface with the extension head 104 of the tracker interface 100 in order to secure the tracker interface 100 to the connection interface 200. The button ramp surfaces 224 are illustrated as being flat but may be curved as well.

Figure 10A:
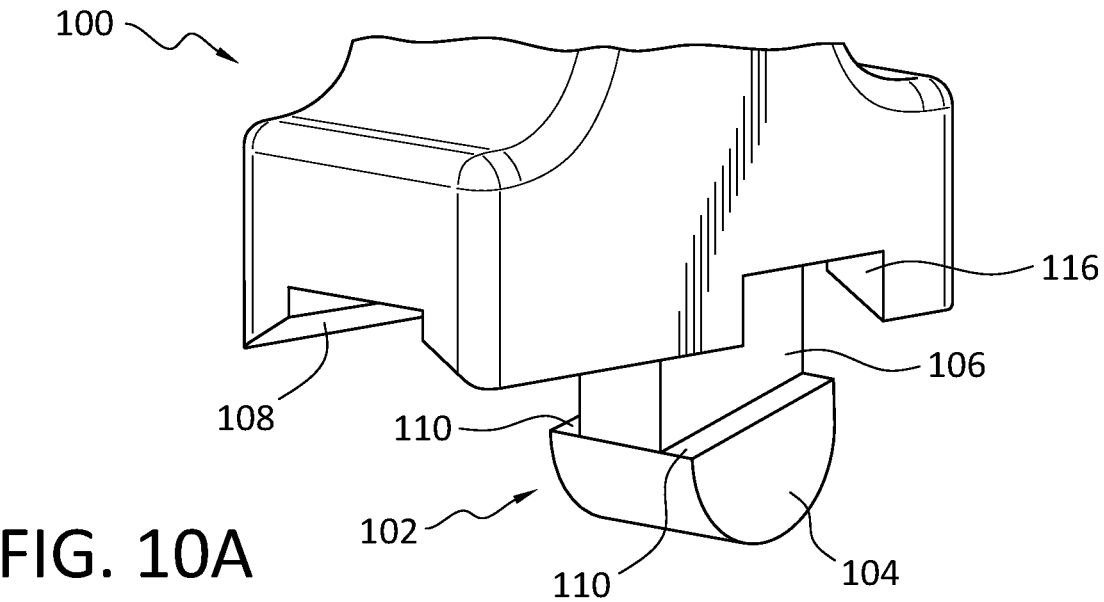
FIGS. 10A and B illustrate perspective and side views of the tracker interface.
Figure 10B:
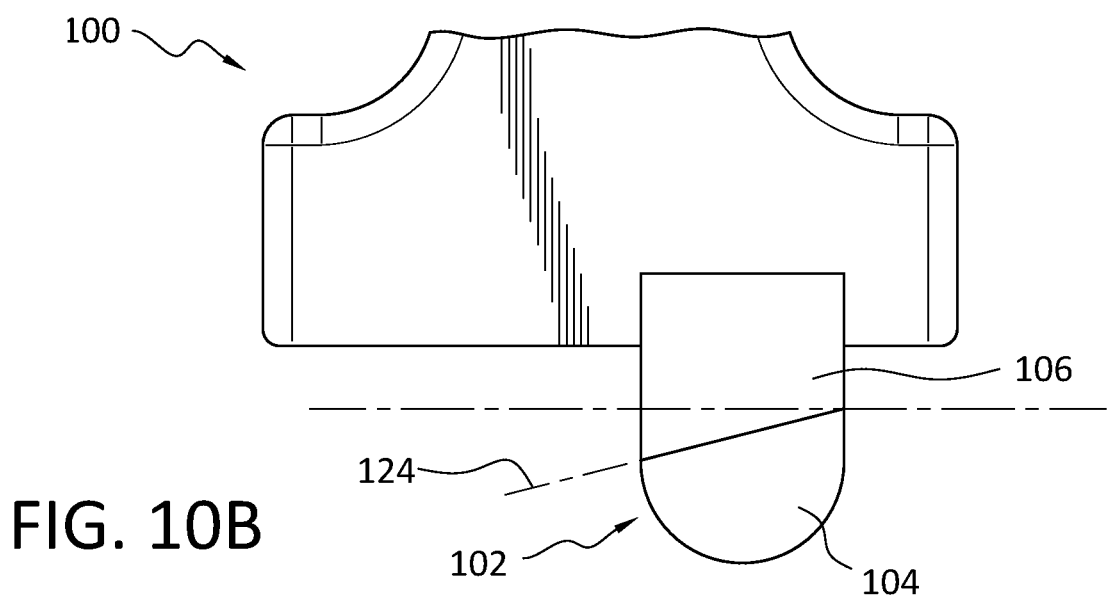
FIG. 10C illustrates a perspective view of the extension member.
Figure 10C:
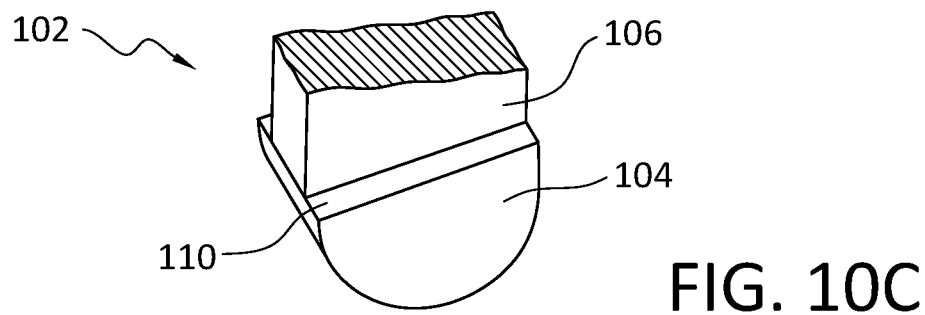
Figure 14A:
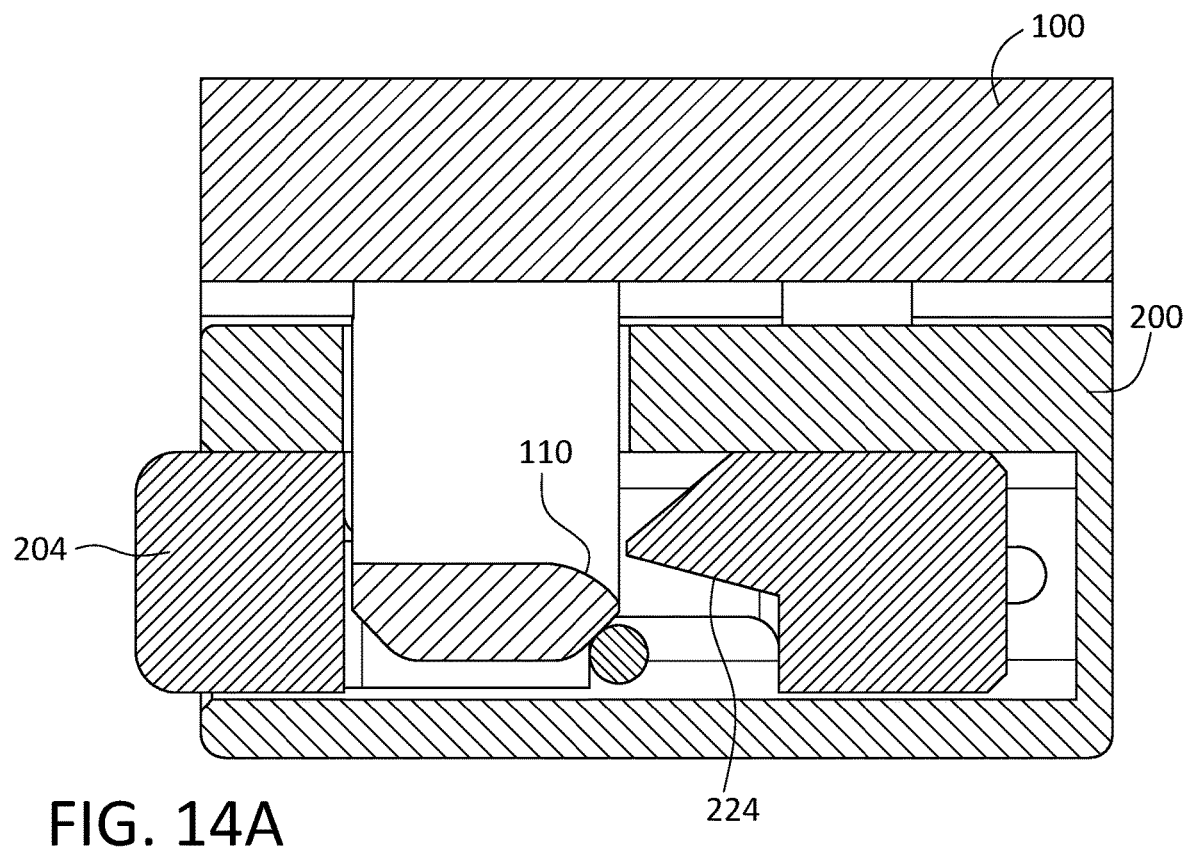
FIGS. 14A and 14B illustrate cross-sectional views of the curved extension ramps.
Figure 14B:
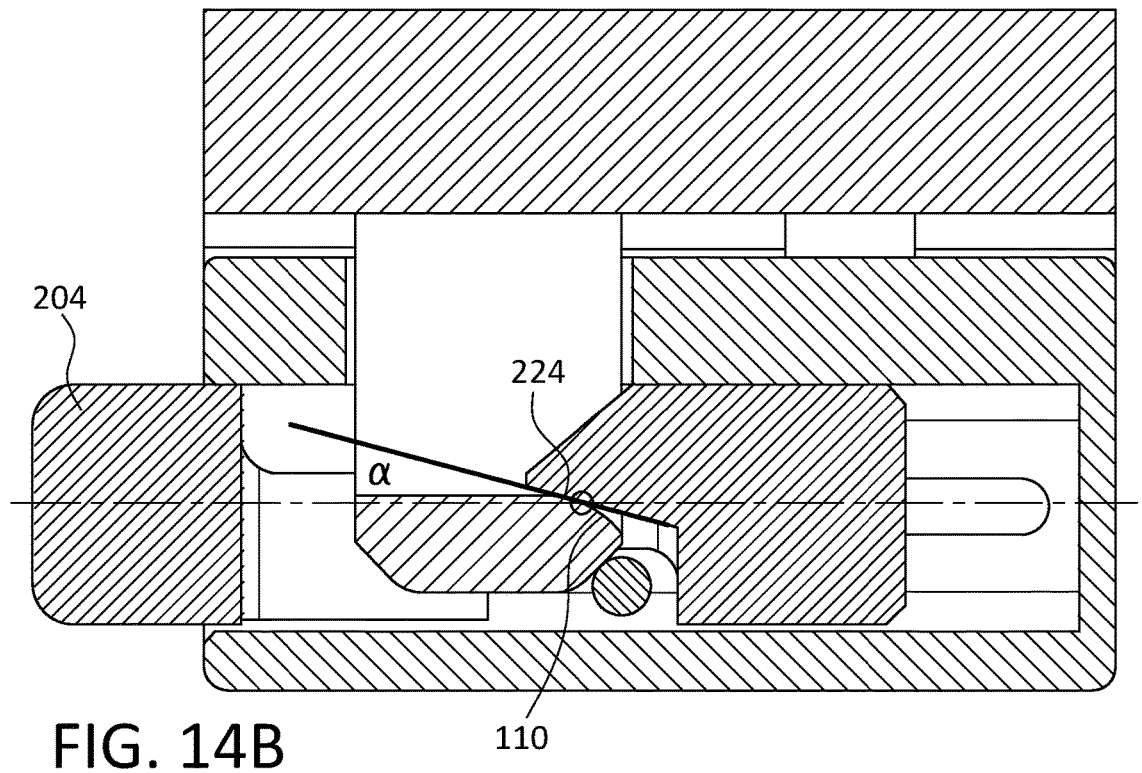

FIGS. 10A and B illustrate perspective and side views of the tracker interface 100. FIG. 10C illustrates a perspective view of the extension member 102. The extension member 102 extends down from the inner surface 114. The extension member 102 includes extension body 106 and extension head 104. The extension body 106 has a generally rectangular shape. The extension head 104 has a generally rounded bottom surface and is wider than the extension head 104 which results in the extension head 104 having extension ramp surfaces 110. Two extension ramp surfaces 110 are illustrated, but in other embodiments only one extension ramp surface 110 may be present. The extension ramp surfaces 110 are at an angle to a horizontal axis of the tracker interface 100 as illustrated in FIG. 10B. The angle of the extension ramp surface 110 corresponds to an angle of the button ramp surface 224. The extension ramp surface 110 helps to form a ramp interface contact line 124 when it contacts the button ramp surface 224 of the button 204. The extension ramp surfaces 110 are illustrated as being flat but may be curved as well. FIGS. 14A and 14B illustrate cross-sectional views of the curved extension ramps.

Figures 11A, 11B:
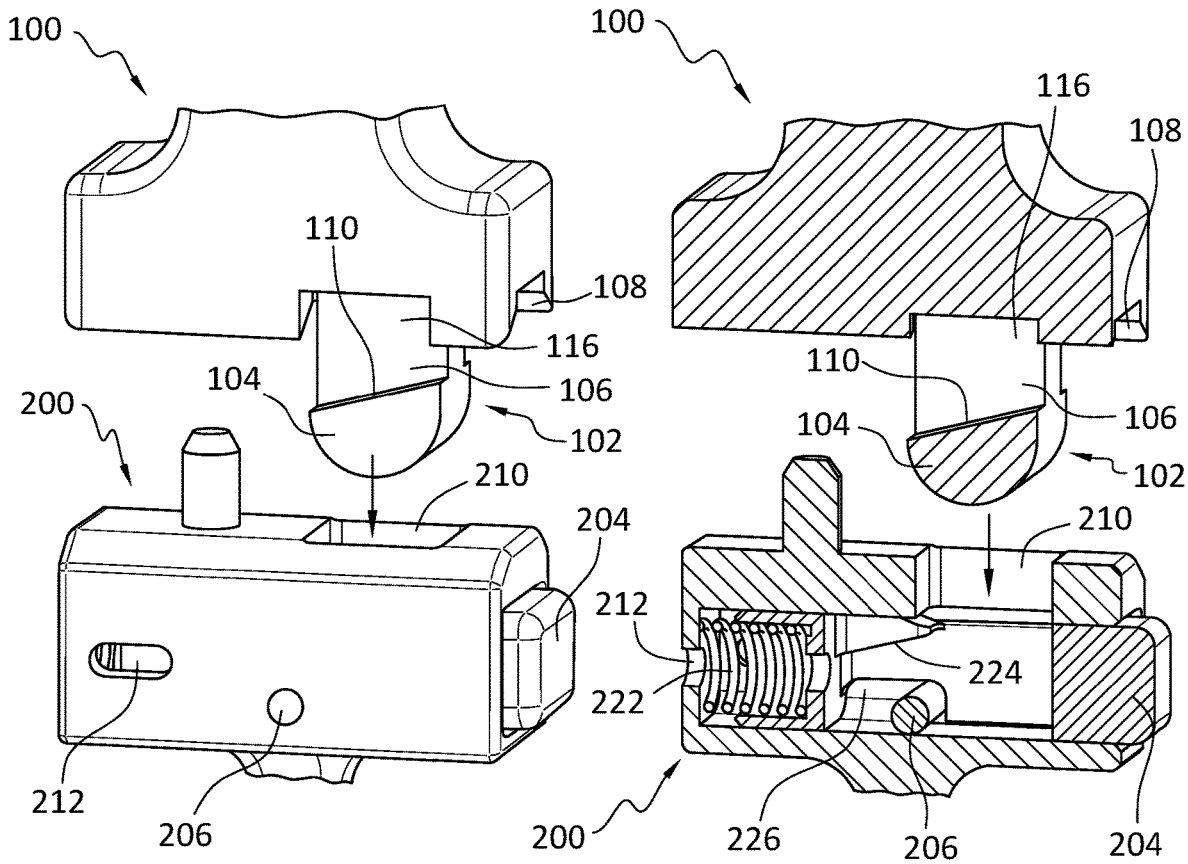
FIGS. 11A and B illustrate a side perspective and side cross-sectional view of the tracker interface separated from and in a position to engage the connection interface.
Figure 11C:
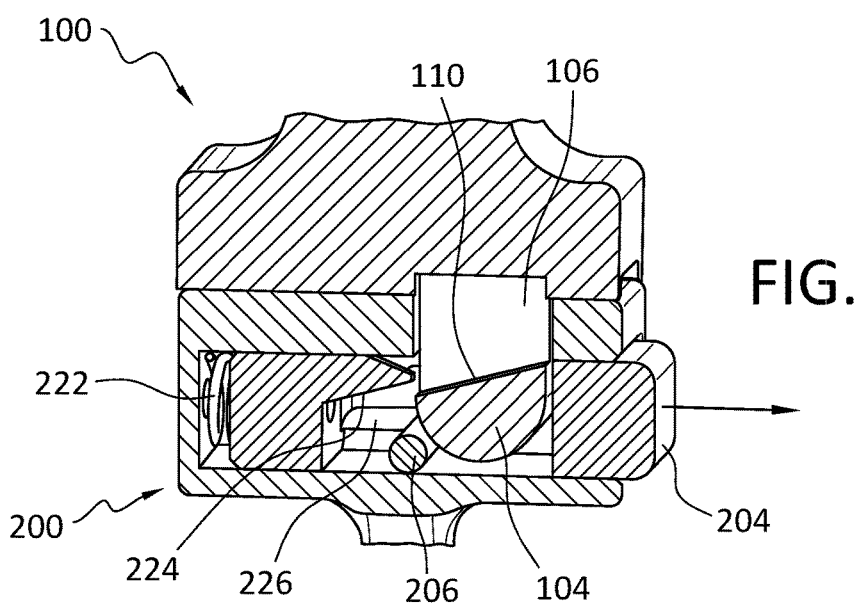
FIG. 11C illustrates a side cross-sectional view of the tracker interface engaged with the connection interface with the button in the open position.

FIGS. 11A and B illustrate a side perspective and side cross-sectional view of the tracker interface 100 separated from and in a position to engage the connection interface 200. FIG. 11C illustrates a side cross-sectional view of the tracker interface 100 engaged with the connection interface 200 with the button in the open position. In order to connect the tracker interface 100 to the connection interface 200, the button 204 is first pushed causing the button opening 228 to align with the housing opening 210. This allows for the extension member 102 of the tracker interface 100 to be inserted into the housing opening 210 and the button opening 228. As a result the interface surfaces 108 engage the curved interface surfaces 214 and the interface pin 208 engages the interface hole 112 as described above to provide the proper alignment between the tracker interface 100 and the connection interface 200. At this point the button 204 may be released.

Figure 12A:
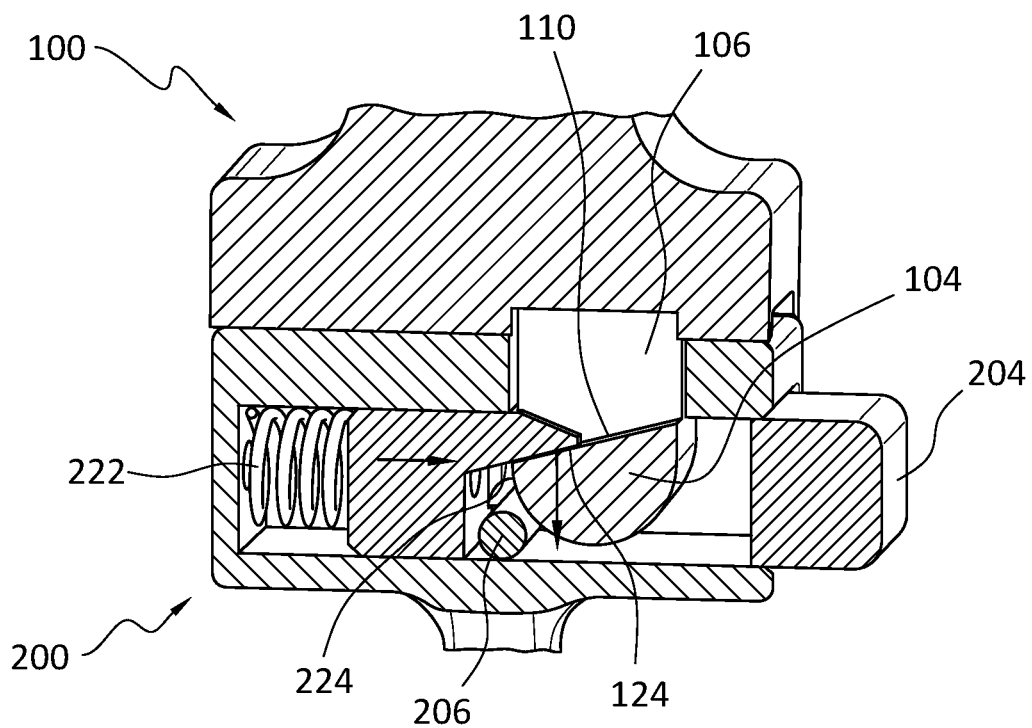
FIGS. 12A and B illustrate side cross-sectional and perspective views of the tracker interface engaged with the connection interface with the button in the closed position.
Figure 12B:
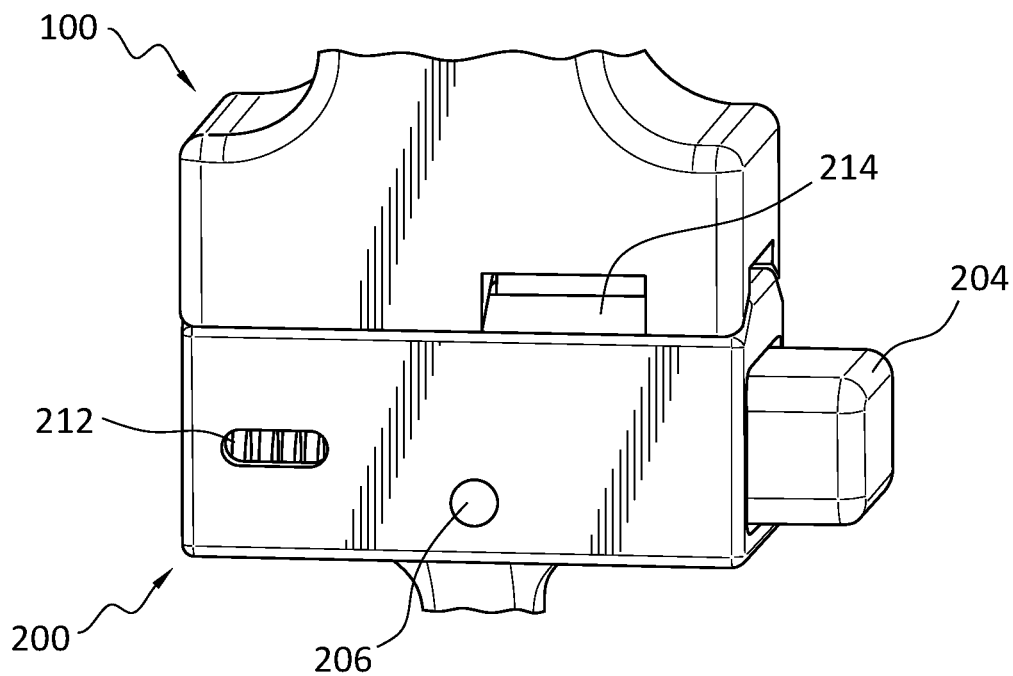

FIGS. 12A and B illustrate side cross-sectional and perspective views of the tracker interface 100 engaged with the connection interface 200 with the button 204 in the closed position. As the button 204 is released, the button 204 slides out of the housing 202 due to the biasing force of the spring 222, and the button ramp surface 224 engages the extension ramp surface 110 at the ramp interface contact line 124. As the button ramp surface 224 engages the extension ramp surface 110, the outward motion of the button 204 is limited, and the button ramp surface 224 exerts a downward force on the extension ramp surface 110. This will also apply a force on the surface interface contact line 120 as described above. This downward force will secure the tracker interface 100 to the connection interface 200. The precise angles of the extension ramp surface 110 and the button ramp surface 224 along with the spring constant of the spring 222 will be chosen to provide sufficient connection force to securely and repeatedly connect the tracker interface 100 to the connection interface 200, while still allowing the button to be pressed in by the user and not needing excessive force. It is noted that the lower the ramp angle, the higher the ratio between the vertical connection force and the needed horizontal button force (i.e., the force to compress the spring.) If this force is greater than the weight of the navigation array 130, then the connection is play free. Further, this force may be set even higher to compensate for vibrations or other forces that might be present in the system (e.g., bumps to the navigation array 130, cleaning of the reflective spheres 134, or other impacts on the navigation array 130).

The embodiments described in the FIGS. illustrate one way in which the various features may be arranged. Alternatively, the features may be interchanged. In one example, the interface surface 108 may be curved and the interface pin 208 may be flat. In another example, the interface pin 208 may be on the tracker interface 100 and the interface hole 112 may be on the connection interface 200. In yet another example, the button 204 and the associated looking member may be implemented on the tracker interface 100 and the extension member 102 may be implemented on the connection interface 200. Further, the orientation or translation direction of the button may be modified. Instead of a button that translates along the length of the connection interface 200, a rotational or spiral movement of a button-like component can be considered along with a torsion spring. In such a case, the orientation of the ramp structures may be adjusted to allow for the proper engagement and clamping force.

Figure 13:
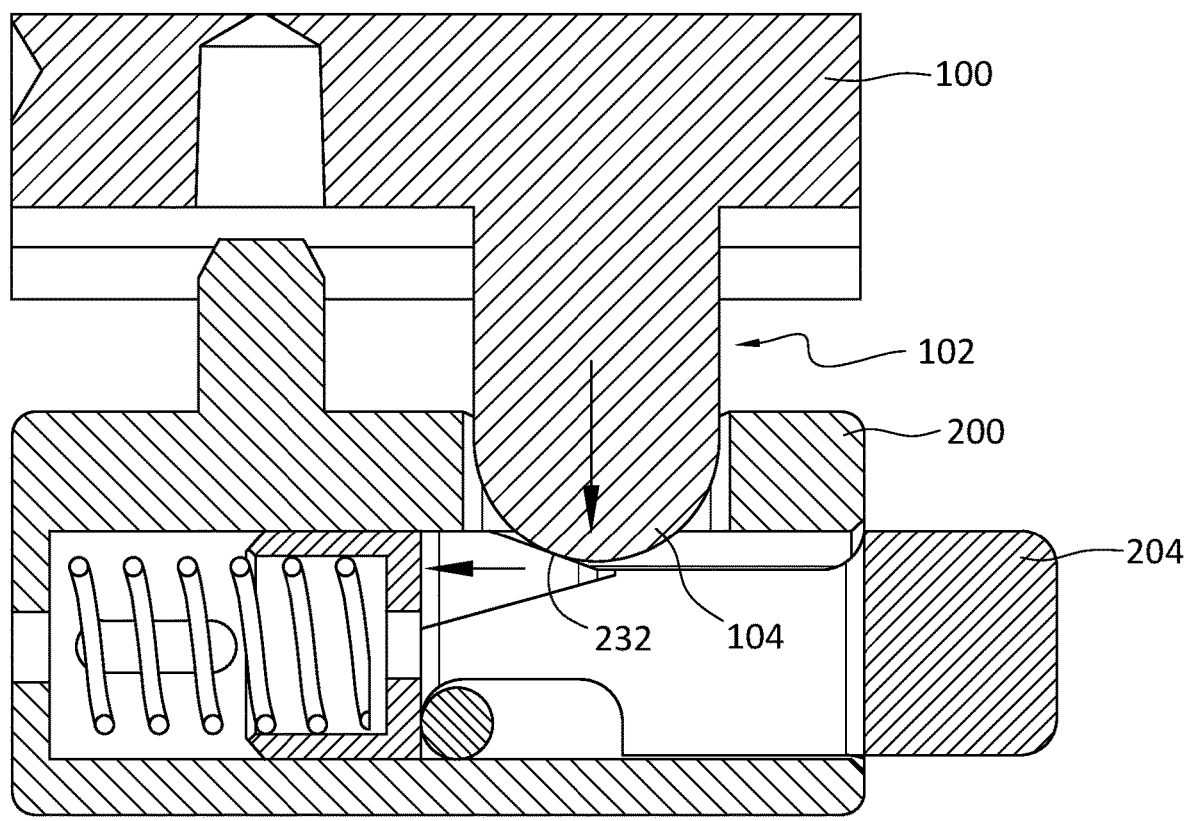
FIG. 13 illustrates the extension coming into contact with the upper ramp surface to then cause the button to move.

Further, the extension head 104 on the extension 102 may be rounded (or sloped), and this allows the extension head 104 to contact the upper ramp surface 232 on the button 204 to thereby push the button 204 inward and then the button 204 will snap back to due to the spring 222 to engage the extension head 104. FIG. 13 illustrates the extension 102 coming into contact with the upper ramp surface 232 to then cause the button 204 to move. This means the array/tracker could be connected without actively pressing the button first.

The foregoing disclosure provides illustration and description but is not intended to be exhaustive or to limit the aspects to the precise form disclosed. Modifications and variations may be made in light of the above disclosure or may be acquired from practice of the aspects.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A navigation tracker connection interface system, comprising:
   a first interface including:
     a first interface surface on a side of the first interface;
     an extension member extending from the side of the first interface having a first extension ramp surface facing the first side; and
     an interface hole on the side of the first interface; and
   a second interface including:
     a housing including:
       a second interface surface on a side of the second interface;
       an interface pin extending from the side of the second interface;
       a housing opening on the side of the second interface; and
       a channel;
     a locking member configured to slide in the channel including:
       a locking member opening; and
       a first locking member ramp surface; and
     a biasing member configured to bias the locking member,
   wherein interface hole is configured to receive the interface pin,
   wherein the first interface surfaces are configured to engage the second interface surfaces, and
   wherein the first locking member ramp surface is configured to engage the first extension ramp surface when the biasing member biases the locking member.

2. The navigation tracker connection interface system of claim 1, wherein the first interface surface is a flat surface and the second interface surface is a curved surface.

3. The navigation tracker connection interface system of claim 2, wherein the second interface surface lies on a perimeter of a circle.

4. The navigation tracker connection interface system of claim 2, wherein the first interface surface has an interrupted V shape.

5. The navigation tracker connection interface system of claim 1, wherein the first interface surface is a curved surface and the second interface surface is a flat surface.

6. The navigation tracker connection interface system of claim 4, wherein the first interface surface lies on a perimeter of a circle.

7. The navigation tracker connection interface system of claim 4, wherein the second interface surface has an interrupted V shape.

8. The navigation tracker connection interface system of claim 1, further comprising:
   a retention pin,
     wherein the locking member further includes a locking member notch,
     wherein the housing includes retention pin holes,
     wherein the retention pin is configured to engage the retention pin holes, and
     wherein the retention pin is configured to engage the locking member notch to limit motion of the locking member.

9. The navigation tracker connection interface system of claim 1, wherein the locking member opening aligns with the housing opening when the locking member is pressed.

10. The navigation tracker connection interface system of claim 1, wherein the extension member includes an extension body and an extension head, wherein the first extension ramp surface is on the extension head and wherein the extension head has a width greater than a width of the extension member.

11. The navigation tracker connection interface system of claim 1, wherein
   the extension member includes a second extension ramp surface,
   wherein locking member includes a second locking member ramp surface, and
   wherein the second locking member ramp surface is configured to engage the second extension ramp surface when the biasing member biases the locking member.

12. The navigation tracker connection interface system of claim 1, wherein the interface hole has a conical shape.

13. The navigation tracker connection interface system of claim 1, wherein the interface pin has one of a conical shape or mushroom shape.

14. The navigation tracker connection interface system of claim 1, wherein the biasing member is configured to biases the locking member in a linear direction along the channel.

15. The navigation tracker connection interface system of claim 1, wherein the biasing member is configured to bias the locking member in a rotational direction.

16. The navigation tracker connection interface system of claim 1, wherein the first interface is connected to an navigation tracker.

17. The navigation tracker connection interface system of claim 1, wherein the first interface is made of plastic and is disposable.

18. The navigation tracker connection interface system of claim 1, wherein the second interface is made of metal.

19. The navigation tracker connection interface system of claim 1, wherein the housing includes a plurality of cleaning ports and the locking member includes a cleaning port.

20. The navigation tracker connection interface system of claim 1, wherein the biasing member is a coiled spring.

* * * * *